US007685871B2

(12) United States Patent
Sinnamon

(10) Patent No.: US 7,685,871 B2
(45) Date of Patent: Mar. 30, 2010

(54) SYSTEM AND METHOD FOR ESTIMATING ENGINE INTERNAL RESIDUAL FRACTION USING SINGLE-CYLINDER SIMULATION AND MEASURED CYLINDER PRESSURE

(75) Inventor: James F. Sinnamon, Birmingham, MI (US)

(73) Assignee: Delphi Technologies, Inc., Troy, MI (US)

( * ) Notice: Subject to any disclaimer, the term of this patent is extended or adjusted under 35 U.S.C. 154(b) by 176 days.

(21) Appl. No.: 12/050,532

(22) Filed: Mar. 18, 2008

(65) Prior Publication Data

US 2009/0235728 A1 Sep. 24, 2009

(51) Int. Cl.
*G01M 15/10* (2006.01)
(52) U.S. Cl. .................................. 73/114.69; 73/118.02
(58) Field of Classification Search ................ 73/23.31, 73/114.69, 114.71, 114.74, 118.01, 118.02
See application file for complete search history.

(56) References Cited

U.S. PATENT DOCUMENTS

| 4,622,939 | A | 11/1986 | Matekunas |  |
|---|---|---|---|---|
| 6,550,451 | B1 * | 4/2003 | Muller et al. | 123/406.45 |
| 6,850,831 | B2 * | 2/2005 | Buckland et al. | 701/102 |
| 6,999,864 | B2 * | 2/2006 | Iizuka et al. | 701/103 |
| 7,275,426 | B2 * | 10/2007 | Lahti et al. | 73/114.32 |

OTHER PUBLICATIONS

"Estimation of the Residual Gas Fraction in an HCCI-engine using Cylinder Pressure," Niklas Ivansson, LiTH-ISY-EX-3441-2003, May 26, 2003.
"Effects of Exhaust Throttling on Engine Performance and Residual Gas in an SI Engine," 2004-01-2974, Jinyoung Jang, Kitae Yeom and Choongsik Bae, Korea Advanced Institute of Science and Technology.
"2-Step Variable Valve Actuation: System Optimization and Integration on an SI Engine," 2006-01-0040, M. Selllnau, T. Kunz, J. Sinnamon and J. Burkhard, Delphi Corporation, Reprinted from: Variable Valve Actuation 2006 (SP-2007), 2006 SAE World Congress, Detroit, Michigan, Apr. 3-6, 2006.
"Co-Simulation Analysis of Transient Response and Control for Engines with Variable Valvetrains," 2007-01-1283, James F. Sinnamon, Delphi Corporation, Reprinted from: Variable Valve Actuation, 2007 (SP-2135), 2007 World Congress, Detroit, Michigan, Apr. 16-19, 2007.

* cited by examiner

*Primary Examiner*—Eric S McCall

(74) *Attorney, Agent, or Firm*—Thomas N. Twomey

(57) ABSTRACT

An estimation apparatus for determining a residual burned gas mass fraction of an internal combustion engine includes a single-cylinder simulator and an optimizer. The residual estimation apparatus does not rely on accurate knowledge of, or calculation of the details of the complex pulsating pressures and flows at the intake and exhaust valves. Instead an iterative approach uses primarily measured cylinder pressure and airflow as driving inputs, to ensure that the simulation states (i.e., pressure, temperature, and composition) of the cylinder gas contents, at the time of intake valve closing, are correct. The burned gas fraction calculated by the engine simulator is then taken as an estimate of that in the actual engine.

17 Claims, 3 Drawing Sheets

SYSTEM AND METHOD FOR ESTIMATING ENGINE INTERNAL RESIDUAL FRACTION USING SINGLE-CYLINDER SIMULATION AND MEASURED CYLINDER PRESSURE

TECHNICAL FIELD

The present invention relates generally to a system and method for estimating engine internal residual burned gas fraction, and more particularly to such a system and method using a single-cylinder simulation and measured cylinder pressure.

BACKGROUND OF THE INVENTION

The importance of internal burned gas residual to engine combustion quality has long been recognized. Historically, the motivation for developing residual estimation methods comes from the fact that it is needed as input to a heat release rate analysis. More recently, it has been recognized that the use of variable valve actuation (VVA) to control and maximize internal dilution may enable the elimination of external EGR systems, along with significant fuel economy and NOx control improvement. More recently the role of internal dilution in the control of advanced-mode combustion systems, such as homogenous charge compression ignition (HCCI), has also been explored. Due to the above factors, there has been a surge of interest in methods of measuring or estimating engine residuals during engine tests.

The physical process of residual generation is complex. During the gas exchange process pressure and velocity pulsations are generated in the intake and exhaust manifolds due to fluid inertia and wave action. These pulsations strongly affect the gas flows through the engine valves that determine the residual content of the trapped charge. Because of the complexity of the process, various experimental techniques have been applied to measure residuals in engines. These experimental techniques can be broadly classified into a) optical, and b) gas-sampling methods. These all require a complex experimental apparatus and are time consuming to perform.

In view of the difficulty of empirical measurement, and in view of recent advances in computer engine cycle simulation, there has been significant effort toward modeling the residual generation process. In one approach, a highly detailed simulation model of the engine and the manifold system is constructed and carefully calibrated against engine test data (e.g., airflow, temperatures and combustion rates) over the entire operating range of interest. The main disadvantage is that the creation and calibration of a sufficiently accurate model is a difficult task, so a substantial time investment by an engineer highly skilled and knowledgeable in the field of engine simulation is required.

A second approach for a detailed process simulation may be referred to as the "port-pressure method". A very simple, fast-executing simulation model of a single engine cylinder (rather than multiple cylinders), without intake and exhaust manifolds, is constructed. Rather than attempting to accurately model the admittedly complex intake and exhaust port pressure dynamics, pressure transducers are installed in the intake and exhaust ports of a dynamometer test engine to measure crank-angle-resolved intake and exhaust port pressure data. These are then used as inputs to the simulation and imposed as boundary conditions, while cylinder pressure data is used to derive the combustion rate inputs. While this method is coming into fairly common use, a disadvantage is that the instrumentation required on a multi-cylinder test engine is somewhat elaborate, costly, and time consuming. Also, the results are sensitive to model inputs for valve train compliance (e.g., effective valve lash) and port flow coefficients for both flow directions at low valve lift, both of which are difficult to accurately measure.

There is therefore a need for a system and method for estimating residual burned gas fraction that minimizes or eliminates one or more of the problems set forth above.

SUMMARY OF THE INVENTION

The present invention is directed to a system and method for estimating residual burned gas fraction in an internal combustion engine. The invention is based on a single-cylinder engine simulation, which is fast enough for on-line engine test applications. Moreover, the approach is potentially more accurate than conventional estimation approaches and does not require crank-angle-resolved measurements of the intake and exhaust port dynamically-variable pressures. The present invention does not rely on simulating the details of the complex pulsating intake and exhaust flows, and instead uses an iterative approach to converge on an estimated residual fraction, using primarily the measured cylinder pressure and airflow inputs to ensure that the state of the cylinder gas contents (i.e., pressure, temperature, composition) at the time of intake valve closing is correct.

An apparatus is provided in accordance with the present invention for determining a residual burned gas fraction in a multi-cylinder internal combustion engine. The apparatus includes a single-cylinder simulator and an optimizer. The simulator is configured to simulate the thermodynamic cycle for one of the cylinders and output an estimated residual burned gas fraction. The simulator is responsive to a plurality of input parameters to develop output values in accordance with a simplified, single-cylinder simulation model. The simulation outputs include a simulated mass air flow rate, a simulated cylinder pressure, a polytropic exponent (more below) and a simulated exhaust temperature.

The optimizer is responsive to a variety of measured parameters associated with the actual operation of the engine (i.e., corresponding to the specific cylinder being simulated) for producing the input parameters provided to the simulator. The input parameters to the simulator may include an intake pressure, an exhaust pressure, a burned gas mass, a valve flow area multiplier and a heat transfer multiplier. The measured parameters used by the optimizer include a measured mass air flow rate, a measured intake air temperature, a measured exhaust temperature and a measured crank-angle-resolved cylinder pressure. In addition, measured time average (or engine cycle average) values for intake and exhaust manifold pressures are provided as inputs to the optimizer, although these do not need to be highly accurate because they are used only for initialization, and are then varied by the optimizer. It also bears emphasizing that in accordance with the present invention, there is no need to measure crank-angle-resolved values for the actual dynamic pressure pulsations of intake or exhaust pressures since as mentioned above these complex pressure variations are not relied on. The optimizer is configured (1) to estimate the intake pressure (i.e., one of input parameters to the simulator) such that the simulated mass air flow rate is equal to the measured mass air flow rate; (2) to estimate the burned gas mass trapped in the cylinder at an intake valve closing time such that the simulated cylinder pressure equals the measured cylinder pressure; and (3) to estimate the heat transfer multiplier (another input parameter to the simulator) such that the simulated exhaust temperature equals the measured exhaust temperature. The simulator is then configured to determine the residual burned gas fraction based on the estimated trapped burned gas mass and the measured engine airflow.

In a preferred embodiment, the optimizer is further configured to determine a cylinder pressure pegging offset using a compression polytropic exponent calculated by the simulator. This "auto-pegging" feature allows measurement of an absolute cylinder pressure while using a relative change pressure sensor, such as the piezoelectric type.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
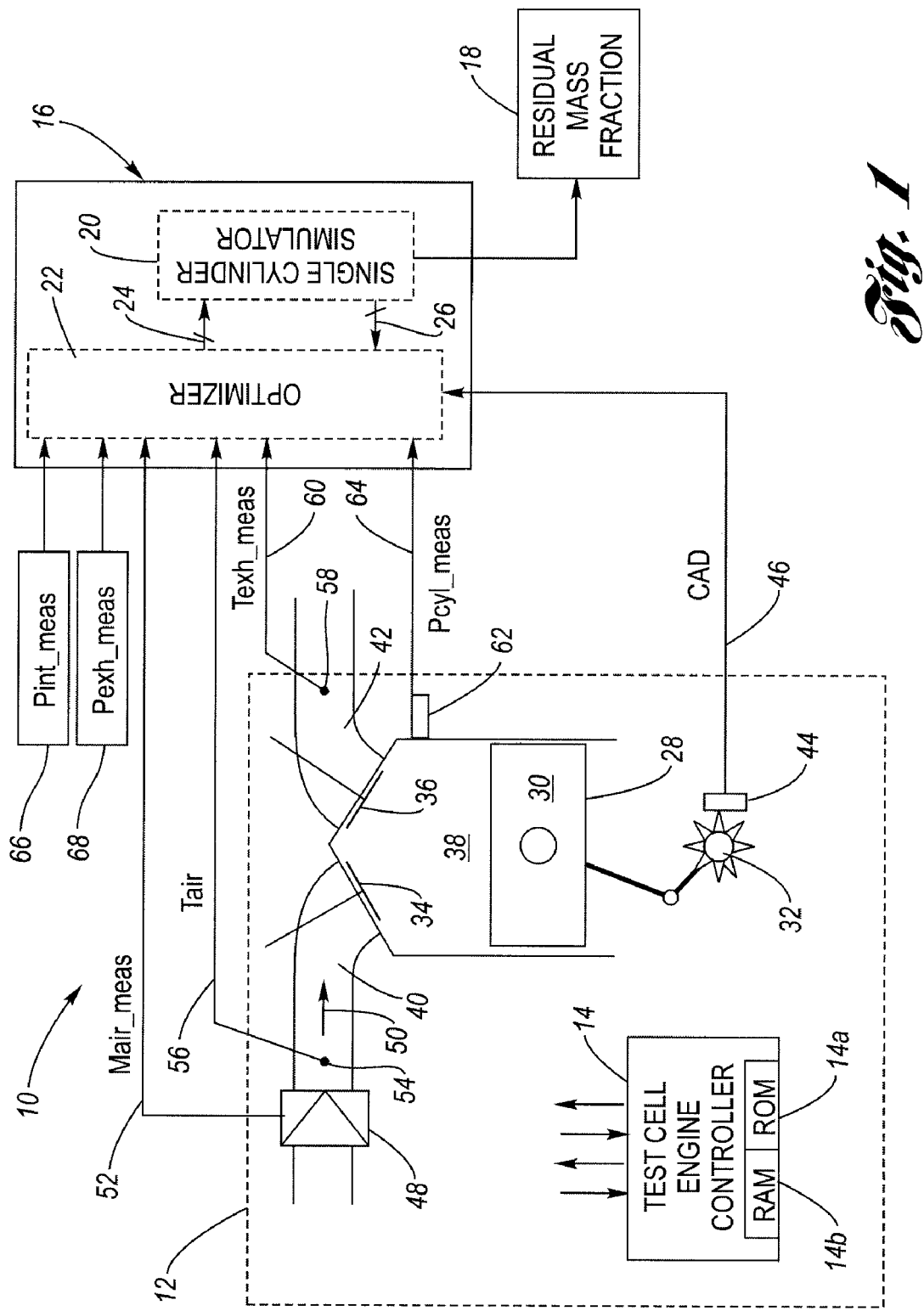
FIG. 1 is a diagrammatic and block diagram of a system including a residual estimator according to the invention.

Referring now to the drawings wherein like reference numerals are used to identify identical components in the various views, FIG. 1 shows a system 10 suitable for use in estimating residual burned gas mass fraction of an internal combustion engine according to the invention. The system 10 includes a test-cell internal combustion engine 12 controlled generally while under test by a test-cell engine controller 14. The engine 12 is the test engine whose residual burned gas mass fraction characteristics are to be estimated, and may be any reciprocating internal combustion engine (such as spark-ignition, compression ignition, etc.), including a number of base engine components, sensing devices, output systems and devices, and a control system.

FIG. 1 also shows an apparatus 16 for estimating the residual burned gas mass fraction 18, shown in block form, of any cylinder of the test engine 12. The estimating apparatus 16 includes a single-cylinder simulator 20 and an optimizer 22. Generally, the single-cylinder simulator 20 is configured to simulate the thermodynamic cycle of the actual cylinder of the engine 12 that is under test and for which data is being measured (more below). In this regard, the simulator 20 is responsive to a plurality of input parameters 24 from the optimizer 22 to develop values for various engine operating variables 26 in accordance with a simplified single cylinder simulation model. Generally, the optimizer 22 produces the input parameters 24 that are input to the simulator 20 in response to (1) a plurality of measured parameters associated with the operation of the one cylinder of the engine 12 and (2) the simulation output variables 26. The estimating apparatus 16 may be implemented on a personal computer (not shown) having a conventional configuration of RAM, ROM, hard-disk drive storage, high-speed central processor, and the like. The simulator 20 may be implemented using conventional modeling approaches, as modified by the particular description herein, including without limitation using and particularly configuring commercially available software. For example, software under the trade designation GT-POWER commercially available from Gamma Technologies, Inc., Westmont Ill., USA, may be used for implementing the simulator 20. Likewise, the optimizer 22 may be implemented using conventional approaches, as modified by the particular description herein, including without limitation using and particularly configuring commercially available software. For example, software under the trade designation SIMULINK, a simulation and model-based design tool commercially available from The MathWorks, Inc., Natick, Mass., USA, may be used for implementing the optimizer 22. It is conventional to employ such packages in concert and it is within the capabilities of one of ordinary in the art, in view of this enabling disclosure, to configure and to coordinate the respective operations of the optimizer 22 and the simulator 20.

The engine system 12 includes a variety of sensors operable to measure ambient conditions, various engine conditions and performance parameters, among other things. The sensors pertinent to the present invention will be identified specifically, and which includes a crankshaft position sensor 44 configured to measure an angular position of the crankshaft and generate an indicative signal 46 (Crank Angle Degrees—CAD), a mass air flow (MAF) sensor 48 configured to measure a mass air flow rate of the intake air (see arrow 50) and generate an indicative signal 52 ($m_{air\_meas}$), an intake air temperature sensor 54 configured to measure an intake air temperature and generate an indicative signal 56 ($T_{air}$), an exhaust gas temperature sensor 58 configured to measure the exhaust gas temperature and generate an indicative signal 60 ($T_{exh\_meas}$) and a cylinder pressure sensor 62 configured to measure cylinder pressure and generate an indicative signal 64 ($P_{cyl\_meas}$). A measured intake pressure signal 66 ($P_{int\_meas}$) and a measured exhaust pressure signal 68 ($P_{exh\_meas}$) are also shown.

As background, the present invention provides a system and method for estimating the residual burned gas mass fraction at the time of intake valve closing. Residual burned gas mass fraction may be defined as the residual burned gas mass divided by the total trapped mass. The ideal gas equation of state applied at this time is set forth in equation (1).

$$M_{trap} = M_{air} + M_{fuel} + M_{egr} + M_{resid} = (P_{cyl} * V_{cyl})/(R * T_{cyl}) \quad (1)$$

As described in equation (1), the trapped mass includes air, fuel, exhaust gas recirculation (EGR) (i.e., recirculated burned gas) and residual (burned gas retained in the cylinder). Air, fuel and EGR all may be accurately measured. The residual estimating apparatus 16 is configured to determine the total burned gas dilution, so if EGR is present in the test engine 12, then EGR must be measured to determine residuals. EGR may be measured by intake manifold $CO_2$ sampling. Cylinder volume, Vcyl, can be accurately calculated from the engine geometry and the crank position. Therefore, if cylinder gas temperature, Tcyl, can be determined with sufficient accuracy, residuals could be calculated by substituting the measured cylinder pressure, Pcyl, at intake valve closing into the above equation (1). One problem is that Tcyl is difficult to determine, and it also depends on residuals. Another problem is that the type of transducer (piezoelectric) commonly used to measure cylinder pressure measures only a relative change of pressure and must be "pegged" in order to obtain absolute pressure values. Pegging with sufficient accuracy to use equation (1) is difficult. These problems have both been addressed by the present invention by coupling the optimizer 22 to the single-cylinder simulator 20. When the optimizer 22 completes its tasks as described below, the estimated residual 18, as calculated by the simulator 20, is output.

With continued reference to FIG. 1, certain of the measured parameters, including the intake manifold pressure 66, the exhaust manifold pressure 68, the air mass flow 52, the intake air temperature 56, and the exhaust temperature 60, are either time-averaged or engine cycle-averaged values. The intake and exhaust pressures 66, 68, however, do not need to be highly accurate since they are used only as initial values in the optimizer 22. The only crank-angle-resolved input to the estimator 16 is the cylinder pressure 64, which is normally a standard measurement available in modern engine test cells.

Figure 2:
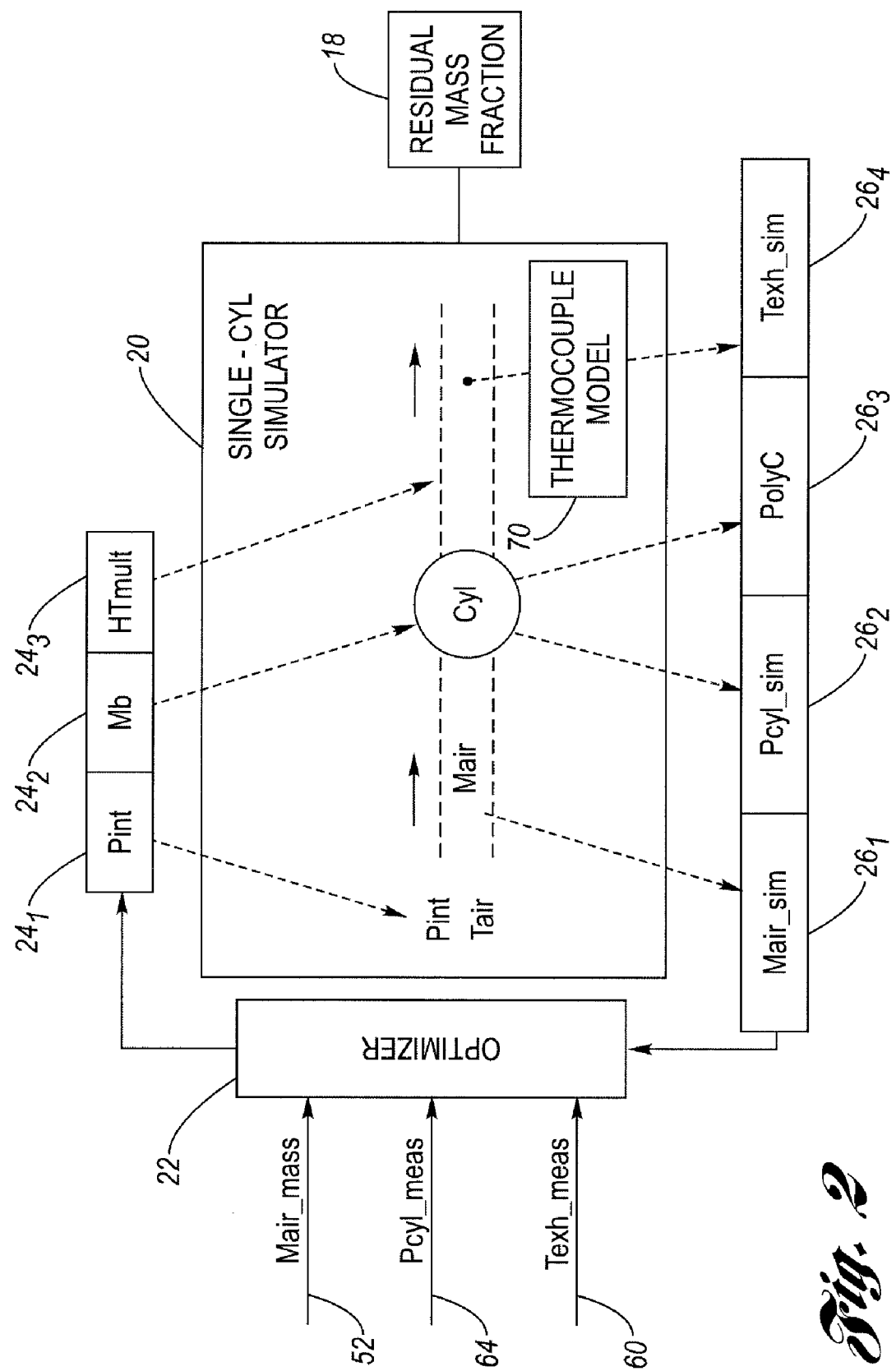
FIG. 2 is a block diagram showing the residual estimator in greater detail as including a single-cylinder simulator and an optimizer.

FIG. 2 is a simplified block diagram showing, in greater detail, the residual estimating apparatus 16 of FIG. 1. As to the simulator 20, FIG. 2 shows the plurality of input parameters 24, shown specifically as including the intake pressure $P_{int}$ $24_1$, the burned gas mass $M_b$ $24_2$, and an exhaust pipe heat transfer multiplier $HT_{mult}$ $24_3$. FIG. 2 further shows the plurality of simulated parameters 26 output from the simulator 20, shown specifically as including a simulated mass air flow rate $m_{air\_sim}$ 1, a simulated cylinder pressure $P_{cyl\_sim}$ $26_2$, a simulated compression polytropic exponent PolyC $26_3$ and a simulated exhaust temperature $Texh_{sim}$ $26_4$. FIG. 2 additionally shows the output of the residual estimating apparatus 16, namely, the residual burned gas fraction 18.

As to the configuration of the simulator 20, it is generally arranged in a highly simplified manner, due in part to the presence of the optimizer 22 (more below). More specifically, as described in the Background, in a real (not simulated) engine, the residual fraction is the result of a complex flow process that involves interaction between intake and exhaust valve lifts, and intake and exhaust port pressures, which vary in time in a very complex manner. During the valve overlap period, exhaust-gas backflows into the intake port and is then drawn into the cylinder during the intake stroke along with the fresh fuel/air charge. Reverse flow of exhaust gas from the exhaust port into the cylinder may also contribute to the residual. These flows oscillate in response to pressure wave pulsation in both the intake and exhaust manifold pipes. Accurate modeling of this complex flow process is difficult.

The residual estimation approach of the present invention does not rely on accurate calculation of the details of these pulsating flows, and instead uses an iterative procedure, using primarily measured cylinder pressure and airflow as inputs, to ensure that the state of the cylinder gas contents at time of intake valve closing (i.e., pressure, temperature, composition) is correct. As to iteration, it should be understood that the residual estimating apparatus 16 may be used to provide a respective residual fraction 18 for each one of a plurality of engine cylinders and for each one of a plurality of speed and load combinations of the engine 12. For any particular cylinder at any particular speed/load combination, the apparatus 16 is configured to iterate until a solution is found for the residual fraction 18. This general procedure may be repeated for all other desired cylinders and speed/load combinations so that an entire data set of residual fraction values may be produced. This data set of residual fraction values may then be used to calibrate a residual model for real-time control of an engine such as the characterized engine. The real-time control aspect may involve conventional look-up tables or the like and will not be described in any further detail herein. In view of this simplified approach, there are a number of features of the simulator 20.

The simulator 20 is configured to have a simulation model to simulate a single-cylinder having only intake and exhaust valves—no intake or exhaust manifolds. This is because, according to the invention, there is no need to compute the particular, time-varying pressure fluctuations due to gas inertia and wave action in the intake and exhaust manifolds of the real engine. The simulation model nonetheless includes "virtual" intake and exhaust pipes in lieu of the respective actual intake and exhaust pipes. The only function of these virtual "pipes" is to provide a means to store backflow gas and perform a wall heat transfer calculation. The simulator 20 is also configured to have generally constant pressures imposed at the upstream and downstream sides of the intake and exhaust valves, respectively. More specifically, these pressures are held constant for the duration of each simulated engine cycle, but may be varied by the optimizer 22 between engine cycles.

In some commercially available simulation codes it may not be convenient to impose constant pressure at the valves. Instead it may be necessary to simulate fluid inertia and wave action in a section of pipe connected to the valves, while still imposing constant pressure at the pipe entrance (for intake) and exit (for exhaust). This is understood to be within the scope of this invention, since there is still no need to measure pressure pulsations on the test engine. Constant valve pressure is the preferred embodiment because computation time is minimized.

The cylinder portion of the simulation model includes a Woschni heat transfer calculation and a simple, approximate model of the combustion process. A highly accurate combustion model is not necessarily required because the calculated residual mass fraction 18 is relatively insensitive to combustion duration. Although a rigorous and accurate heat release analysis may be employed, a fast, approximate heat release calculation using the measured cylinder pressure record is sufficient.

FIG. 2 also shows the optimizer 22, which receives the simulated parameters 26 from the simulator 20 and produces the input parameters 24 that are fed back into the simulator 20. In addition, the optimizer 22 is responsive to various measured parameters, which are shown as the measured mass air flow rate $m_{air\_meas}$ 52, the measured cylinder pressure $P_{cyl\_meas}$ 64 and the measured exhaust temperature $T_{exh\_meas}$ 60. The optimizer 22 is configured to perform a number of functions, described as follows.

First, the optimizer 22 is configured to iteratively determine a value for the intake pressure $24_1$, $P_{int}$, such that simulated airflow $m_{air\_sim}$ $26_1$ equals the measured mass airflow rate $m_{air\_meas}$ 52. Since manifold pressure pulsations are ignored, as described above, this pressure will differ somewhat from the measured average manifold pressure.

Second, the optimizer 22 is configured to iteratively determine the mass of burned gas mass $M_b$ $24_2$ trapped at the time of intake valve closing such that the simulated cylinder pressure $P_{cyl\_sim}$ $26_2$ matches the measured cylinder pressure $P_{cyl\_meas}$ 64. Preferably, the measured cylinder pressure is averaged over a crank angle window early in the compression stroke, but after intake valve closing, in order to minimize the effect of noise in the Pcyl measurement. This optimizer function is needed to compensate for error in the trapped residual gas calculated by the simulator 20 due to neglecting the detailed pressure and flow pulsations at the valves. There are several embodiments that will be described for this second function, i.e., how the optimizer 22 and simulator 20 are configured to modulate the trapped burned gas mass $M_b$ into the cylinder, which will be described in greater detail below. It is understood that the symbol $M_b$ $24_2$ represents any one, or any combination of several input parameters to the simulator that may be varied with the effect of changing the trapped residual gas. It should be appreciated that the trapped burned gas mass will be composed of residual burned gas mass as well as EGR burned gas (if any).

Third, the optimizer 22 is configured to determine the exhaust pipe heat transfer multiplier $HT_{mult}$ $24_3$ such that measured $T_{exh\_meas}$ 60 and simulated $T_{exh\_sim}$ $26_4$ exhaust temperatures are equal. This feature improves the accuracy of the residual fraction estimation 18 for cases where a large portion of the residual is generated by exhaust backflow. The simulator 20 may include a thermocouple model 70 to improve the accuracy of the simulated temperature $T_{exh\_sim}$ 26$_4$. Alternatively, a radiation-shielded exposed-junction thermocouple may be used during engine test.

Fourth, the optimizer 22 is configured to determine a cylinder pressure pegging offset using values of the compression polytropic exponent 26$_3$, polyC, calculated by the simulator 20. This procedure will be referred to herein as "auto-pegging" and will be discussed in greater detail below.

As described above, the present invention provides five embodiments of optimizer 22 and simulator 20 for determining the trapped burned gas mass $M_b$, each reflecting a different approach for modulating the simulated trapped burned gas mass $M_b$ calculated by the simulator 20. It should be understood that additional methods of adjusting simulated burned gas mass may exist and that the embodiments described below are intended as illustrative examples. The essence of the invention is simply that simulated burned gas content is modulated by varying some simulation parameters, regardless of the particular method used to accomplish said modulation.

In a first embodiment for modulating $M_b$, a burned gas source/sink is connected at the upstream side of the intake valve (not shown), or directly to the cylinder (as shown), depending on the mode of residual generation. In a mode when the source of residual is intake valve backflow, the optimizer 22 is then configured to modulate the source/sink flow rate at the intake valve during the intake backflow period. To accommodate the case for which there is no intake backflow, a second mode is provided where the source/sink is directly connected to the cylinder (as shown). One such case is a so-called negative valve overlap (NVO) where the exhaust valve closes prior to TDC and the intake valve opens after TDC (i.e., no valve overlap) to trap large amounts of residual in the cylinder without any backflows. In this NVO mode, the source/sink is activated during the negative valve overlap (NVO) period. Another zero-intake backflow case involves dual-equal cam phasing in which both intake valve opening and exhaust valve closing occur after TDC so that most of the residual is supplied by exhaust backflow into the cylinder early in the intake stroke. For this case, the source/sink provides flow into or out of the cylinder during the intake stroke. For both of these modes, the temperature of the burned gas added is set equal to the instantaneous cylinder temperature. In the mode where the residual is generated primarily by backflow of exhaust into the cylinder the source/sink temperature set equal to exhaust port gas temperature.

In a second embodiment for modulating $M_b$, both the intake and the exhaust valve effective flow areas are modulated during their respective periods of backflow. This affects trapped residual gas by increasing or decreasing the mass flow rate of backflow at a given port pressure condition. Thus, port perturbation, rather than a burned gas source/sink, may be used for adjustment of the residual. This approach still requires a burned gas source/sink at the cylinder to handle the negative valve overlap (NVO) case.

Figure 3:
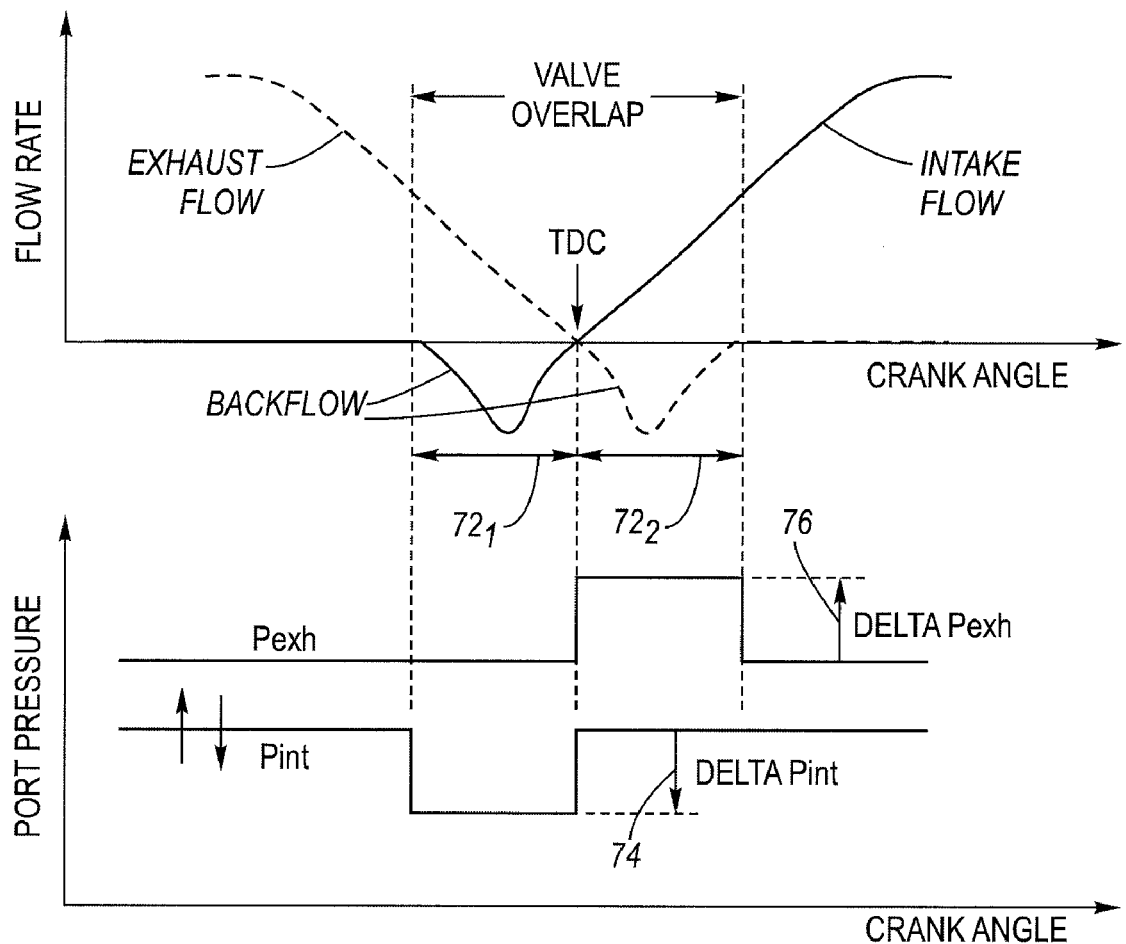
FIG. 3 are timing diagrams showing modulation of intake and exhaust port pressures during their respective backflow periods, according to one embodiment of the invention.

FIG. 3 is a pair of timing diagrams illustrating a third embodiment for modulating Mb. In this embodiment, the intake and exhaust pressures are still held constant for most of the cycle, and the intake pressure is still varied (iteratively on a cycle-to-cycle basis) to obtain the measured airflow, but now an additional adjustment to the intake and exhaust pressures, deltaPint and deltaPexh, are applied only during periods of backflow. The optimizer 22 is configured to adjust backflow of residual gas by modulating deltaPint and deltaPexh until simulated cylinder pressure during the compression stroke is equal to measured cylinder pressure. Specifically, during the valve overlap backflow occurs during a first backflow interval 72$_1$, and during a second backflow interval 72$_2$. During the first backflow interval 72$_1$, the intake pressure $P_{int}$ is changed by an amount of delta $P_{int}$ (reference numeral 74). As shown, $P_{int}$ may be either increasing or decreasing generally. During the second backflow interval 72$_2$, the exhaust pressure is changed in a direction opposite to that of intake by an amount delta Pexh (reference numeral 76). This third embodiment is an alternative method of accomplishing the same effect as in the second embodiment.

In a fourth embodiment for modulating Mb, only exhaust port pressure is modulated. Exhaust pressure is held constant throughout each simulated engine cycle, but varied from cycle-to-cycle by the optimizer 22. Adjusting Pexh affects intake and exhaust valve backflows in roughly equal proportions, as well as affecting the mass of burned gas trapped at the start of a negative overlap period. This embodiment provides a simple and robust strategy for covering all modes of residual generation. The disadvantage is that temperature conditions may become unrealistic if a large shift in Pexh relative to the measured value is required.

The fifth and preferred embodiment is a combination of the second and fourth embodiments for modulating Mb. This provides the most accurate and robust implementation for estimating residual burned gas mass 18.

After the optimizer 22 has completed its tasks, as described above, the simulator 20 will have calculated all the quantities needed to satisfy equation (1) while providing the most realistic possible estimate of gas temperature. Note that this method uses only the early compression portion of the measured cylinder pressure data, where errors due to transducer thermal shock are a minimum, and where cylinder gas temperature can be simulated most accurately.

Cylinder Pressure Pegging. At this time, the only pressure transducers capable of surviving in-cylinder temperature conditions are of the piezoelectric type, which measure only relative pressure change, and require "pegging" by some independent means in order to yield an absolute pressure. Several approaches for "pegging" are known in the art and use an independent reference obtained using an absolute pressure transducer. All of these known methods are either not sufficiently accurate or are too difficult to apply in the present invention.

An alternative and preferred pegging method is referred to as "polyC-pegging" as seen by reference to U.S. Pat. No. 4,622,939 entitled "ENGINE COMBUSTION CONTROL WITH IGNITION TIMING BY PRESSURE RATIO MANAGEMENT" issued to Matekunas, herein incorporated by reference. This approach relies on the fact that a polytropic exponent, polyC, calculated using the cylinder pressure data during the compression stroke, depends on pegging, so if an accurate value for the exponent is known, then the corresponding pegging pressure can be calculated. The difficulty is that the value of polyC depends on gas temperature, composition (air, fuel, burned gas), heat transfer, and leakage—none of which can be accurately determined a-priori. This difficulty has been addressed by using the value of polyC calculated by the simulator 20 to peg the measured cylinder pressure data. PolyC is continually fed back to the optimizer 22, so the pressure data is dynamically pegged as simulated gas temperature and composition vary during convergence, to finally yield a self-consistent set of airflow-pressure-temperature-residual values.

In the preferred embodiment, the compression polytropic exponent 26$_3$, PolyC, may be evaluated by averaging over a 30 crank degree interval starting at 90 degrees BTDC. This crank degree interval is selected primarily to minimize the effect of cylinder wall heat transfer and cylinder leakage, which are both low during early compression. In addition, the rate of pressure rise is high enough to reduce the effect of noise in the measured pressure signal to tolerable levels.

In accordance with the present invention, a system and method is provided for estimating the residual burned gas fraction for an internal combustion engine. The core of the methodology involves iteration using a highly simplified engine cycle simulation, rather than measuring the complex pressure fluctuations in the intake and exhaust ports, which iteration includes a number of steps performed mainly by the optimizer 22. First, modulating the value of the intake port pressure, $P_{int}$, until the simulated air flow, $M_{air}$, is equal to the measured value. Second, modulating the addition or the subtraction of burned gas, Mb, until the simulated cylinder pressure, $P_{cyl-sim}$, during the compression stroke is equal to the measured value. Third, modulating the exhaust port heat transfer multiplier, $HT_{mult}$, until the simulated value of exhaust temperature is equal to the measured value. Additionally, determining a cylinder pressure pegging value using the compression polytrophic exponent polyC. When the iterative process is complete, the residual gas fraction 18 from the simulator 20 is taken as the estimate of the actual engine residual.

It should be understood that the electronic engine controller 14 in FIG. 1, normally used for control of engine operating conditions such, for example spark timing, throttle position, etc. may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM 14a, RAM 14b, a combination of non-volatile and volatile (modifiable) memory so that the software can be stored and yet allow storage and processing of dynamically produced data and/or signals. It should also be understood that the present invention may be implemented in software residing in a dedicated computer, separate from the engine control computer 14, having apparatus needed for measurement of the required test engine variables, while not used for engine control purposes.

Finally, for completeness sake, the base engine components of the engine system 12 shown include an engine block with a plurality of cylinders, one of which is shown in FIG. 1 and is designated cylinder 28. Each cylinder 28 contains a respective piston 30 operably attached to a crankshaft 32. There is a head at the top of each piston 30 containing one or more air intake valves 34 and associated lift/actuation mechanization, one or more exhaust valves 36, and a spark plug (not shown). A combustion chamber 38 is formed within cylinder 28 between piston 30 and the head. An intake manifold 40 is fluidly connected to the engine head, substantially adjacent to the air intake valves 34. The intake manifold 40 is connected to an air control valve (not shown). An exhaust manifold 42 is fluidly connected to the engine head substantially adjacent to the exhaust valves 36 and facilitates the flow of exhaust gases away from the combustion chamber.

The invention claimed is:

1. An apparatus for determining a residual burned gas fraction in a multi-cylinder internal combustion engine, comprising:
    a single-cylinder simulator configured to simulate a thermodynamic cycle for at least one of the cylinders and output said residual burned gas fraction, said simulator being responsive to a plurality of simulator input parameters to develop values for engine operating variables in accordance with a simulation model, said engine operating variables including a simulated mass air flow rate, a simulated cylinder pressure, a polytropic exponent and a simulated exhaust temperature; and
    an optimizer responsive to measured parameters associated with the operation of said one cylinder and being configured to produce values for said simulator input parameters including an intake pressure, one or more burned-gas parameters used to modulate simulated burned gas mass and a heat transfer multiplier, said measured parameters including a measured mass air flow rate, a measured intake air temperature, a measured exhaust temperature and a measured crankshaft-angular-position-resolved cylinder pressure, said optimizer being further configured (1) to estimate said intake pressure such that said simulated mass air flow rate corresponds to said measured mass air flow rate; (2) to estimate said burned gas mass trapped in said cylinder at an intake valve closing time such that said simulated cylinder pressure corresponds to said measured cylinder pressure; and (3) to estimate said heat transfer multiplier such said simulated exhaust temperature corresponds to said measured exhaust temperature;
    wherein said simulator is further configured to determine said residual burned gas fraction based on said estimated trapped burned gas mass.

2. The apparatus of claim 1 wherein said simulator is configured to determine said residual fraction based further on an exhaust gas recirculation (EGR) amount.

3. The apparatus of claim 1 wherein said optimizer is further responsive to measured initial conditions of said cylinder comprising a measured intake pressure and a measured exhaust pressure.

4. The apparatus of claim 1 wherein said measured mass air flow rate, said measured intake air temperature, and said measured exhaust temperature are conditioned according to a selected one of time averaging and engine cycle averaging.

5. The apparatus of claim 1 wherein said simulation model comprises an intake pipe in communication with an intake valve of the cylinder, an exhaust pipe in communication with an exhaust valve of the cylinder, said model configuring said pipes to store burned gas backflow.

6. The apparatus of claim 5 wherein said model is configured so that constant pressures are imposed at the upstream and downstream sides of the intake and exhaust valves, respectively.

7. The apparatus of claim 6 wherein said single-cylinder simulator includes a thermocouple model responsive to said heat transfer multiplier configured to generate said simulated exhaust temperature.

8. The apparatus of claim 1 wherein said single-cylinder simulator is configured to determine a compression polytropic exponent.

9. The apparatus of claim 1 wherein said optimizer is configured to estimate said intake pressure as a constant over a combustion cycle without variations attributable to intake manifold pressure pulsations.

10. The apparatus of claim 1 wherein said measured cylinder pressure is averaged over a crank angle window within a compression stroke of said cylinder.

11. The apparatus of claim 5 wherein the apparatus configured to iterate over a number of combustion cycles for a preselected engine speed and load in order for said optimizer to converge said input parameters to a preselected solution criteria.

12. The apparatus of claim 11 wherein the optimizer is configured to modulate said intake pressure at said intake valve of said model on a cycle-by-cycle basis, and maintain said intake pressure at said intake valve of said model constant for a selected one iteration.

13. The apparatus of claim 12 where the exhaust pressure is maintained at a constant pressure at said exhaust valve of said model for said plurality of iterations for said preselected engine speed/load.

14. The apparatus of claim 11 where the optimizer is configured to modulate a first source/sink rate of burned gas mass to said intake valve of said model during intake backflow, and where the optimizer is configured to modulate a second source/sink rate of burned gas mass to said cylinder of said model during negative valve overlap, or during exhaust backflow.

15. The apparatus of claim 11 where the optimizer is configured to modulate intake and exhaust valve effective flow areas during respective intervals of backflow so as to adjust trapped burned gas mass in said cylinder of said model.

16. The apparatus of claim 11 where the optimizer is configured to adjust intake and exhaust pressure at the intake and exhaust valves of said model during their respective backflow intervals.

17. The apparatus of claim 11 where the optimizer is configured to adjust an exhaust pressure at the exhaust valve of said model, constant during each simulated engine cycle, but varied from cycle-to-cycle.

* * * * *